(12) United States Patent
Schindler et al.

(10) Patent No.: US 7,603,570 B2
(45) Date of Patent: Oct. 13, 2009

(54) POWER DELIVERY OVER ETHERNET CABLES

(75) Inventors: Frederick R. Schindler, Sunnyvale, CA (US); Wael William Diab, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 344 days.

(21) Appl. No.: 10/845,021

(22) Filed: May 13, 2004

(65) Prior Publication Data

US 2005/0268120 A1    Dec. 1, 2005

(51) Int. Cl.
*G06F 1/00* (2006.01)

(52) U.S. Cl. ...................................... 713/300

(58) Field of Classification Search ......... 713/300–340; 370/286, 310, 538, 593, 657–664, 693
See application file for complete search history.

(56) References Cited

U.S. PATENT DOCUMENTS

| | | | |
|---|---|---|---|
| 4,131,767 A | 12/1978 | Weinstein | 179/170.2 |
| 4,161,719 A | 7/1979 | Parikh et al. | 340/147 SY |
| 4,232,199 A | 11/1980 | Boatwright et al. | 179/18 B |
| 4,397,020 A | 8/1983 | Howson | 370/105 |
| 4,532,626 A | 7/1985 | Flores et al. | 370/85 |
| 4,599,494 A | 7/1986 | Welty | 179/84 T |
| 4,626,954 A | 12/1986 | Damiano et al. | 361/96 |
| 4,710,949 A | 12/1987 | Ahuja | 379/26 |
| 4,723,267 A | 2/1988 | Jones et al. | 379/93 |
| 4,835,737 A | 5/1989 | Herrig et al. | 710/302 |
| 4,875,223 A | 10/1989 | Curtis | 375/36 |
| 4,969,179 A | 11/1990 | Kanare et al. | 379/33 |
| 5,029,201 A | 7/1991 | Bindels | 379/98 |
| 5,034,948 A | 7/1991 | Mizutani et al. | 379/79 |
| 5,056,131 A | 10/1991 | Kanare et al. | 379/33 |
| RE33,900 E | 4/1992 | Howson | 370/105 |
| 5,122,691 A | 6/1992 | Balakrishnan | 326/86 |
| 5,199,049 A | 3/1993 | Wilson | 375/104 |
| 5,223,806 A | 6/1993 | Curtis et al. | 333/12 |
| 5,237,511 A | 8/1993 | Caird et al. | 702/58 |
| 5,268,592 A | 12/1993 | Bellamy et al. | 307/43 |
| 5,289,359 A | 2/1994 | Ziermann | 363/21.11 |
| 5,311,518 A | 5/1994 | Takato et al. | 370/110.1 |
| 5,321,372 A | 6/1994 | Smith | 333/1 |

(Continued)

FOREIGN PATENT DOCUMENTS

WO    WO 99/53408    10/1999

OTHER PUBLICATIONS

Notification of PCT Search Report and Written Opinion for International Application No. PCT/US05/12656, filed Oct. 12, 2006.

(Continued)

*Primary Examiner*—Thomas Lee
*Assistant Examiner*—Mohammed H Rehman
(74) *Attorney, Agent, or Firm*—Baker Botts L.L.P.

(57) ABSTRACT

A method for power delivery comprises coupling an Ethernet cable comprising four wire pairs to a power delivery system and providing power to a powered device on all of the wire pairs. A power delivery system includes an interface operable to couple to an Ethernet cable comprising four wire pairs and a controller operable to provide power to a powered device on all of the wire pairs.

2 Claims, 1 Drawing Sheet

U.S. PATENT DOCUMENTS

| | | | |
|---|---|---|---|
| 5,386,567 A | 1/1995 | Lien et al. | 713/100 |
| 5,406,260 A | 4/1995 | Cummings et al. | 340/568 |
| 5,461,671 A | 10/1995 | Sakuragi et al. | 379/400 |
| 5,483,574 A | 1/1996 | Yuyama | 379/32.04 |
| 5,491,804 A | 2/1996 | Heath et al. | 710/7 |
| 5,531,612 A | 7/1996 | Goodall et al. | 439/541.5 |
| 5,541,957 A | 7/1996 | Lau | 375/258 |
| 5,574,748 A | 11/1996 | Vander Mey et al. | 375/204 |
| 5,608,792 A | 3/1997 | Laidler | 379/386 |
| 5,613,130 A | 3/1997 | Teng et al. | 713/300 |
| 5,639,267 A | 6/1997 | Loudermilk | 439/701 |
| 5,655,077 A | 8/1997 | Jones et al. | 395/187.01 |
| 5,659,542 A | 8/1997 | Bell et al. | 370/496 |
| 5,671,354 A | 9/1997 | Ito et al. | 395/187.01 |
| 5,684,950 A | 11/1997 | Dare et al. | 395/187.01 |
| 5,726,506 A | 3/1998 | Wood | 307/147 |
| 5,742,513 A | 4/1998 | Bouhenguel et al. | 700/286 |
| 5,758,102 A | 5/1998 | Carey et al. | 710/302 |
| 5,775,946 A | 7/1998 | Briones | 439/607 |
| 5,790,391 A | 8/1998 | Stich et al. | 363/24 |
| 5,790,873 A | 8/1998 | Popper et al. | 713/300 |
| 5,793,987 A | 8/1998 | Quackenbush et al. | 710/100 |
| 5,796,185 A | 8/1998 | Takata et al. | 307/140 |
| 5,799,040 A | 8/1998 | Lau | 375/258 |
| 5,802,042 A | 9/1998 | Natarajan et al. | 370/255 |
| 5,809,256 A | 9/1998 | Najemy | 710/302 |
| 5,815,665 A | 9/1998 | Teper et al. | 395/200.59 |
| 5,834,925 A | 11/1998 | Chesavage | 323/272 |
| 5,884,233 A | 3/1999 | Brown | 702/61 |
| 5,918,016 A | 6/1999 | Brewer et al. | 395/200.5 |
| 5,944,824 A | 8/1999 | He | 713/201 |
| 5,947,773 A | 9/1999 | Karam | 439/676 |
| 5,991,885 A | 11/1999 | Chang et al. | 713/300 |
| 5,994,998 A | 11/1999 | Fisher et al. | 340/310.01 |
| 6,011,910 A | 1/2000 | Chau et al. | 395/200.59 |
| 6,021,496 A | 2/2000 | Dutcher et al. | 713/202 |
| 6,033,266 A | 3/2000 | Long | 439/676 |
| 6,036,547 A | 3/2000 | Belopolsky et al. | 439/626 |
| 6,047,376 A | 4/2000 | Hosoe | 713/201 |
| 6,059,581 A | 5/2000 | Wu | 439/79 |
| 6,068,520 A | 5/2000 | Winings et al. | 439/676 |
| 6,092,196 A | 7/2000 | Reiche | 713/200 |
| 6,099,349 A | 8/2000 | Boutros | 439/541.5 |
| 6,115,468 A | 9/2000 | De Nicolo | 379/413 |
| 6,134,666 A | 10/2000 | De Nicolo | 713/300 |
| 6,140,911 A | 10/2000 | Fisher et al. | 340/310.01 |
| 6,162,089 A | 12/2000 | Costello et al. | 439/541.5 |
| 6,218,930 B1 | 4/2001 | Katzenberg et al. | 340/310.01 |
| 6,233,128 B1 | 5/2001 | Spencer et al. | 361/86 |
| 6,295,356 B1 | 9/2001 | De Nicolo | 379/413 |
| 6,308,240 B1 | 10/2001 | De Nicolo | 710/300 |
| 6,310,781 B1 | 10/2001 | Karam | 361/764 |
| 6,347,949 B1 | 2/2002 | Edwards et al. | 439/170 |
| 6,396,392 B1 | 5/2002 | Abraham | 370/282 |
| 6,535,983 B1 | 3/2003 | McCormack et al. | 713/310 |
| 6,541,878 B1 | 4/2003 | Diab | 307/17 |
| 6,701,443 B1 | 3/2004 | Bell | 713/300 |
| 6,762,675 B1 | 7/2004 | Cafiero et al. | 340/10.42 |
| 6,764,343 B2 * | 7/2004 | Ferentz | 439/620.01 |
| 6,804,351 B1 | 10/2004 | Karam | 379/413 |
| 6,912,145 B2 * | 6/2005 | Hung et al. | 363/125 |
| 7,154,381 B2 * | 12/2006 | Lang et al. | 340/310.11 |
| 2002/0063584 A1 | 5/2002 | Molenda et al. | 327/67 |
| 2003/0061522 A1 | 3/2003 | Ke et al. | |
| 2003/0072438 A1 | 4/2003 | Le Creff et al. | |
| 2003/0093701 A1 * | 5/2003 | Freyman et al. | 713/300 |
| 2003/0146765 A1 * | 8/2003 | Darshan et al. | 324/539 |
| 2003/0194912 A1 | 10/2003 | Ferentz | |
| 2004/0073597 A1 | 4/2004 | Caveney et al. | |
| 2004/0146061 A1 * | 7/2004 | Bisceglia et al. | 370/419 |
| 2004/0156496 A1 | 8/2004 | Karam | 379/413 |
| 2004/0268160 A1 * | 12/2004 | Atkinson et al. | 713/300 |
| 2005/0085212 A1 * | 4/2005 | Peker et al. | 455/402 |
| 2005/0132240 A1 * | 6/2005 | Stineman et al. | 713/300 |
| 2005/0197094 A1 | 9/2005 | Darshan et al. | 455/402 |
| 2006/0089230 A1 * | 4/2006 | Biederman et al. | 477/34 |

OTHER PUBLICATIONS

International Search Report for International Application No. PCT/US2005/036328, date of mailing Aug. 3, 2006.

Invitation to Pay Additional Fees (Partial International Search), Application No. PCT/US2005/036328, date of mailing May 26, 2006.

Mendelson, G., White Paper "All You Need to Know About Power Over Ethernet (PoE) and the IEEE 802.3af Standard", pp. 1-24, Jun. 2004.

"3COM® NJ100 Network Jack Power", printed from http://www.poweroverethernet.com/manual/content/view/full/7760, 3Com, Tuesday, Mar. 18, 2003.

3Com User Guide-3Com IntellIJack, Model NJ220, Version 1.0, 3Com, Nov. 2003.

Kiss, Peter (candidate), "Chapter 3, Cascaded Delta-Sigma ADCs", Thesis; "Politehnica" University of Timisoara; cover page plus pp. 45-71, Aug. 20, 1999 revised: Dec. 31, 1999.

Daniel Dove, Powerpoint Presentation, "Power over the DTE", Jan. 2000.

Robert Muir, Powerpoint Presentation: "Update on Diode Discovery Process", May 2000.

"Data Terminal Equipment (DTE) Power via Media Dependent Interface (MDI)", IEEE P802.3af/D3.01 (Revision of IEEE Std. 802.3-2000), May 2002.

"33. Data Terminal Equipment (DTE) Power via Media Dependent Interface (MDI)", Draft Supplement to IEEE Standard 802.3 (IEEE Draft P802.3af/D3.2), Sep. 5, 2002.

"Amendment: Data Terminal Equipment (DTE) Power via Media Dependent Interface (MDI)", IEEE Draft P802.3af/D4.3, (IEEE Standards Department, Draft Amendment 802-3-2002), Apr. 2003.

Hugh Barrass, "Multi-Pair Aggregate Power Distribution"—U.S. Appl. No. 10/287,886, filed Nov. 4, 2002, pp. 1-25.

Jeffrey D. Provost, "Inline Power Control"—U.S. Appl. No. 10/618,211, filed Jul. 11, 2003, pp. 1-15.

Daniel C. Biederman, "Inline Power Based Device Communications"—U.S. Appl. No. 10/651,596, filed Aug. 29, 2003, pp. 1-27.

Cafiero, et al. "Method and Apparatus for Remote Powering of Device Connected to Network"—U.S. Appl. No. 10/836,923, filed Apr. 29, 2004, pp. 1-16.

Roger A. Karam, "Method and Apparatus for Detecting a Compatible Phantom Powered Device Using Common Mode Signaling"—U.S. Appl. No. 10/855,212, filed May 26, 2004, pp. 1-29.

IEEE Draft P802.3af/D3.0; IEEE Computer Society, The Institute of Electrical and Electronics Engineers, Inc., 2001.

IEEE Draft P802.3af/D3.01; IEEE Computer Society, The Institute of Electrical and Electronics Engineers, Inc., 2001.

IEEE Draft P802.3af/D3.1; IEEE Computer Society, The Institute of Electrical and Electronics Engineers, Inc., 2002.

IEEE Draft P802.3af/D3.2; IEEE Computer Society, The Institute of Electrical and Electronics Engineers, Inc., 2002.

IEEE Draft P802.3af/D4.0; IEEE Computer Society, The Institute of Electrical and Electronics Engineers, Inc., 2002.

"*IEEE Standards*"; P802.3af™; IEEE Computer Society, The Institute of Electrical and Electronics Engineers, Inc., Jun. 18, 2003.

IEEE Draft P802.3af/D4.01; IEEE Computer Society, The Institute of Electrical and Electronics Engineers, Inc., 2003.

* cited by examiner

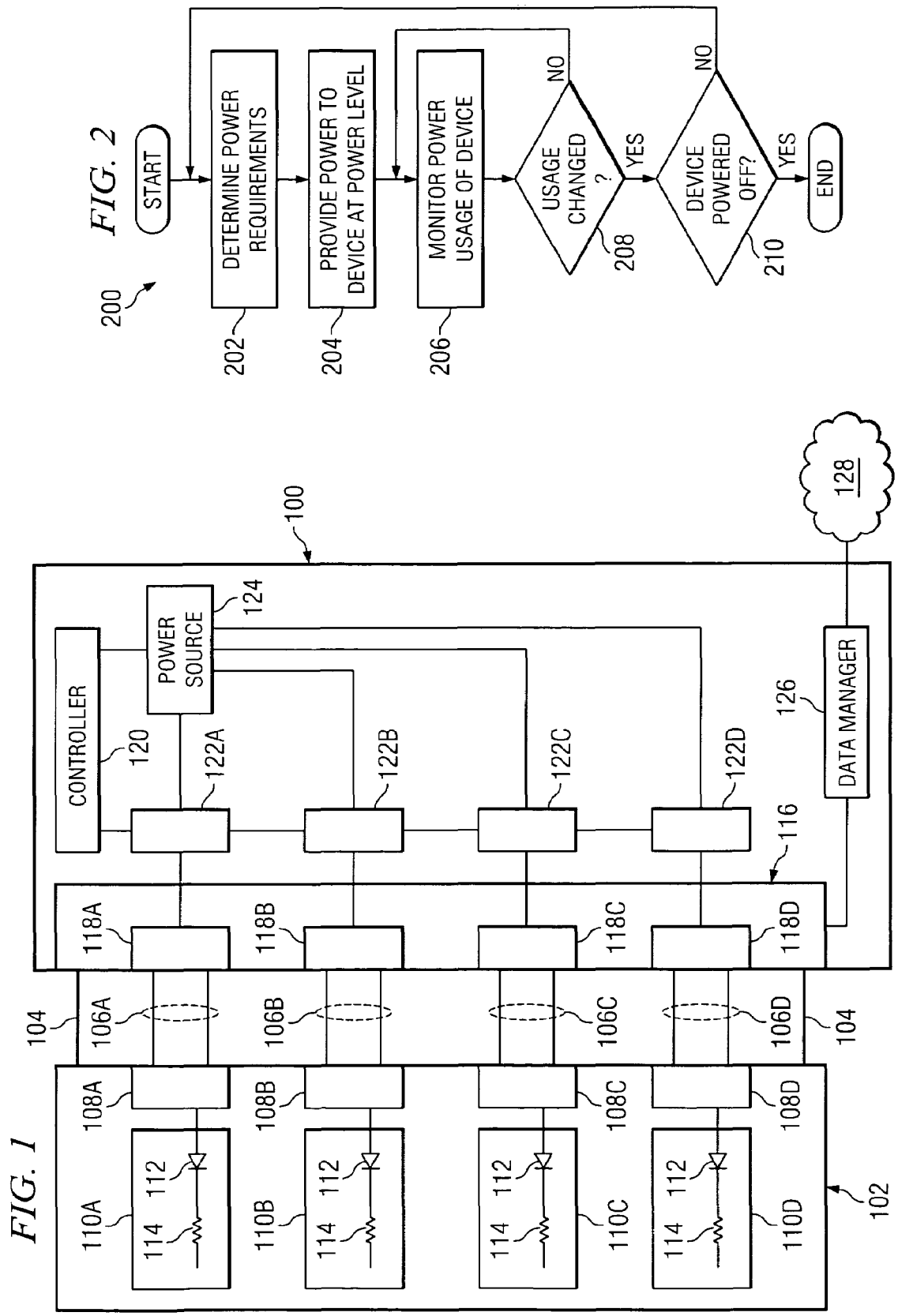

POWER DELIVERY OVER ETHERNET CABLES

TECHNICAL FIELD OF THE INVENTION

This invention relates in general to telecommunications, and more particularly to a method and system for improved power delivery over Ethernet cables.

BACKGROUND OF THE INVENTION

Numerous powered devices utilize power delivered over four-pair Ethernet cables. IEEE has issued a standard, IEEE 802.3af, that specifies methods of power delivery over Ethernet. In particular, the standard describes the use of two of the four pairs to deliver power to a powered device. However, as telecommunication devices adapt to meet new communication demands, such devices may have different power needs, which may include the need for additional power. Accordingly, an improved method for delivering power to powered devices would be useful.

SUMMARY OF THE INVENTION

In accordance with one embodiment of the present invention, a method for power delivery includes coupling an Ethernet cable comprising four wire pairs to a power delivery system and providing power to a powered device on all of the wire pairs.

In accordance with another embodiment of the present invention, a power delivery system includes an interface operable to couple to an Ethernet cable comprising four wire pairs and a controller operable to provide power to a powered device on all of the wire pairs.

Important technical advantages of certain embodiments of the present invention include increased power to powered devices. Certain powered devices, such as wireless communication hubs or docking stations, may be able to make use of more power than provided by conventional power delivery systems. Certain embodiments of the present invention provide increased power for such applications.

Other important technical advantages of certain embodiments of the present invention include supplying a variable power levels to a powered device. Certain embodiments of the present invention may provide different levels of power based on the power demand of the powered device or devices. Thus, such embodiments may be used in conjunction with a variety of devices with different power needs.

Still other technical advantages of certain embodiments of the present invention include methods for determining the power level required by a powered device. Certain embodiments of the present invention include detecting the power level required by a device by communicating with the device. Accordingly, the power level may be adjusted based upon feedback from the powered device.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 1 illustrates a power delivery system in accordance with a particular embodiment of the present invention; and FIG. 2 illustrates an example method of operation for the power delivery system of FIG. 1.

DETAILED DESCRIPTION OF EXAMPLE EMBODIMENTS OF THE INVENTION

FIG. 1 illustrates a power delivery system 100 for delivering power to one or more powered devices 102 using Ethernet grade cables, such as Ethernet cables 104. Ethernet cable 104 is any suitable cable set, such as category 3, 4, or 5 cable, used to communicate information using the Ethernet protocol to powered device 102, such as 10/100BaseT Ethernet cable. Power delivery system 100 provides power to powered device 102 using up to all four of the pairs 106 (collectively referring to pairs 106A, 106B, 106C, and 106D) in Ethernet cable 104. In one embodiment, more than one pair 106 may be used by providing power through a plurality of ports each coupled to a particular pair 106. In one embodiment, more than one pair 106 may be used by providing power through a port coupled to multiple pairs 106. This may provide advantages over conventional systems that provide power to powered devices using only two pairs of the Ethernet cable at a time, such as those described by the standard IEEE 802.3af.

Powered device 102 is any suitable device that is powered at least partially by power delivered over Ethernet cables 104 by power delivery system 100. Powered device 102 may include devices such as a telephone, a personal computer (PC), a personal digital assistant (PDA), a laptop, a wireless network access point, or a docking station for one or more other powered devices such as those described above. Powered device 102 may include any suitable displays, interfaces, handsets, microphones, speakers, or other devices that may consume power. In the depicted embodiment, powered device 102 includes four ports 108A, 108B, 108C, and 108D (collectively referred to as "ports 108"). Each port 108 couples to one of the pairs 106 in Ethernet cable 104.

Powered device 102 receives power from Ethernet cable 104 using power couplers 110A, 110B, 110C, and 110D (collectively referred to as "power couplers 110"). Power couplers 110 may be any suitable transformer, diode bridge, rectifier, or other component or collection of components for extracting power from Ethernet cable 104. In a particular embodiment, power couplers 110 include diodes 112 and resistors 114. Diodes 112 allow power to be received from cable 104, while resistors 114 regulate the current flow from cable 104 to device 102 through each port 108. This reduces the risk that there will be a significant imbalance in the amount of power delivered through any particular port 108, which is turn minimizes the risk of overheated components, electrical arcs, and other potential side effects of such an imbalance.

In conventional systems, Ethernet over four-pair cables functions in one of several modes: 10 megabits per second (10 Mbps), 100 megabits per second (100 Mbps), or one gigabit per second (1 Gbps, 1000 Mbps), for example. In 100 Mbps operation, two of the four pairs are used to communicate both information and power, while the remaining pairs are unused. In principle, the unused pairs could be omitted from the Ethernet cable, but they are often included to allow the network to be upgraded to 1 Gbps. In 1 Gbps operation, all four pairs are used to communicate information, and two pairs are also used to communicate power.

Power delivery system 100 allows power to be delivered to powered device 102 using all four pairs 106 in Ethernet cable 104. By increasing the number of available wires used for power, power delivery system 100 allows more power to be delivered to powered device 102. On the other hand, power delivery system 100 may also damage devices if, after determining that it is appropriate to apply power to a device, system 100 applies power at a level that is not appropriate for the device being used. Accordingly, it is desirable to include methods for controlling the amount of power communicated to a particular device.

In a particular embodiment, power delivery system 100 includes an interface 116 having four ports 118A, 118B, 118C, and 118D (collectively referred to as "ports 118"). In one embodiment, each port 118 is coupled to a particular pair 106. In another embodiment, more than one pair 106 may be coupled to a single port 118. Power delivery system 100 includes a controller 120 that controls an array of switches 122 (referring collectively to switches 122A, 122B, 122C, and 122D) in order to regulate the amount of current provided to ports 118 by power source 124. Power delivery system 100 also includes a data manager 126, which may include any hardware and/or software for exchanging information between a network 128, such as an Ethernet network, and powered device 102 using ports 118. Network 128 may include any suitable device or devices for communicating information in packets, cells, frames, segments, or other portions of information (collectively referred to as "packets"), which may be suitably converted to and from any suitable format by data manager 126.

Interface 116 is any suitable physical interface for communicating electrical signals using Ethernet cable 104. Interface 116 communicates power as well as information received from data manager 126 to powered device 102. Interface 116 may be adaptable to 100 Mbps and 1 Gbps Ethernet operation, and may communicate power using any of its ports 118.

Controller 120 represents any suitable microprocessor, microcontroller, or other hardware and/or software for controlling the operation of power delivery system 100. In particular, controller 120 controls switches 122. Diodes 112 are used in their respective power couplers 110 that ensure that the correct polarity voltage is connected to circuits within powered device 110. In one embodiment, diodes 112 may be used as a switch, and may be substituted with any components for regulating the power delivered to ports 118, such as mechanical, magnetic, or electrical relays. Power source 124 may be any suitable source for providing voltage to ports 118.

In operation, in one embodiment, power delivery system 100 delivers power to powered device 102 using any or all of pairs 106. In one embodiment, power delivery system 100 delivers power to powered device 102 using any or all of ports 118. In another embodiment, power delivery system 100 delivers power to powered device 102 using one or more ports 118, where each port 118 is coupled to multiple pairs 106. In some embodiments, controller 120 provides power to none, two, or four pairs 106. In an embodiment where controller 120 provides power to all four pairs 106, powered device 102 may need to include resistors 114 and/or diodes 112 in power couplers 110 to ensure that the correct voltage is connected to the circuits within powered device 102, and for regulating the amount of power received by a particular port 108 in order to prevent excessive power from being delivered to a single port 108. In other embodiments, power delivery system 100 may deliver power using two pairs 106 if device 102 is configured to receive power from only two pairs 106 and may deliver power using four pairs 106 if device 102 is configured to receive power using all four pairs 106.

In embodiments in which power delivery system 100 has multiple modes of operation, such as, for example, two-pair and four-pair operation, power delivery system 100 may communicate with device 102 in order to determine the appropriate mode of operation. The communication between power delivery system 100 and device 102 may be accomplished in a variety of ways, and in general, any communication link allowing device 102 and system 100 to exchange power information may be used. Power information may include any suitable type of information, such as the number of pairs 106 to be powered or the amount of power to be supplied on each pair 106.

In a particular embodiment, power delivery system 100 may determine power characteristics for the device by monitoring the response of device 102 to voltage and current values on ports 118. For example, after detecting the power need of powered device 102, power delivery system 100 may initially transmit power using all ports 118 and reduce the number of ports 118 used to transmit power in response to detecting that the power is not being used by device 102. During operation of device 102, the power responses of device 102 may be monitored to determine more accurately the power usage characteristics of device 102. This information may be used to adjust the amount of power provided to one or more ports 118, thus permitting more efficient use of power overall.

In other embodiments, power delivery system 100 may exchange information with device 102 using a communication protocol. In a particular embodiment, the device discovery protocol, one example of which is Cisco Discover Protocol (CDP), may include power information for device 102. Thus, when device 102 is coupled to a network, components of the network, such as power delivery system 100, may automatically recognize the power requirements of device 102. Technical advantages of such embodiments may include flexibility and adaptability. Such information may be added to an already-existing discovery protocol, and the power information may be modified or expanded within the protocol as needed.

In another embodiment, device 102 and power delivery system 100 may exchange information using the connection established by the power delivery protocol. Examples of a power delivery protocol include CDP, and IEEE 802.3af classification; however, any protocol that is used for communicating information concerning power may be a power delivery protocol. In one example, power delivery system 100 may use a side band protocol or a side protocol associated with the power delivery protocol to exchange power information with device 102. A "side protocol" refers to a protocol that does not interfere with any pre-existing protocols. In another example, device 102 and system 100 may use otherwise-unused messages or classes in the power delivery protocol. As an illustration, reserved classes in the IEEE 802.3af standards could be used to communicate power information for device 102. Technical advantages include that the power level can be established before device power-on, and that the described techniques may be implemented by modifying already-existing communication protocols.

One advantage of particular embodiments is adaptability to multiport devices. Thus, for example, a docking station could be coupled to an Ethernet jack. The amount of power provided by the jack—the power normally derived from a single power supply to ensure that safe electrical low voltage is present—could be adjusted based on the number of devices coupled to the docking station, so that the power could be increased as additional devices (such as PDAs or laptops) are coupled to the docking station or decreased as devices are removed. In another example, a wireless access point could be coupled to a jack, and the power could be increased or decreased based on the power usage of the wireless device, which may be influenced by factors such as the number of wireless devices in communication with the access point.

Another advantage of particular embodiments is compatibility with advanced power management techniques. For example, power delivery system 100 may determine that the same amount of power would be more efficiently delivered using more pairs 106, and accordingly, system 100 may adjust power delivery to accommodate this increased efficiency.

FIG. 2 is a flow chart 200 illustrating one example of a method of operation for power delivery system 100. At step 202, power delivery system 100 determines a power level for device 102, which may be in response to detecting that device 102 has been coupled to a network. This step may include providing power at a predetermined level and monitoring the response of device 102 to the power provided. Alternatively, power delivery system 100 may exchange power information with device 102 to determine a suitable power level. Controller 120 sets the power applied to ports 118 based on the determination of the power requirements of device 102 at step 204.

Power delivery system 100 then monitors the power usage of device 102 at step 206. If there is no change in the power usage of device 102, then power delivery system 100 may continue to provide power and monitor power usage, as shown at decision step 208. If there is a change in the power usage of device 102, power delivery system 100 determines whether the device has been powered off or disconnected from the network at step 210. If device 102 has been powered off, then system 100 returns to a search for a powered device, and the method is at an end.

If there has been a change in power usage other than device 102 being powered off or disconnected, power delivery system 100 determines a new power level for device 102 at step 202. For example, if a device has been disconnected from a multiport docking station, power delivery system 100 may reduce the amount of power provided to device 102. In another example, device 102 may switch into a power-save mode, thus using less power, and power delivery system 100 may reduce the power delivered to device 102 accordingly. The method then repeats until device 102 is powered down or disconnected from the network.

The described method of operation is only one of numerous possible methods of operation corresponding to various embodiments of power delivery system. For example, particular methods of operation could involve setting the power level initially without modifying the power level in response to changes in power usage by device 102. In general, the steps of the described method may be performed in any suitable order, and particular steps may be added, rearranged, or omitted. Furthermore, any method of operation consistent with any of the embodiments described above may be employed.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for power delivery, comprising:
   coupling an Ethernet cable comprising a plurality of wire pairs to a power delivery system, the plurality of wire pairs including each and every connector operable to provide power to a powered device and further including each and every connector operable to provide information to and from the powered device;
   providing power to the powered device on all of the wire pairs;
   after providing power to the powered device on all of the wire pairs, determining that the powered device requires less power than an amount provided by all of the wire pairs, and in response, providing power on a reduced number of wire pairs, the reduced number of wire pairs being greater than zero wire pairs; and wherein:
   the powered device is coupled to the Ethernet-grade cable using a plurality of power couplers; and
   the power couplers each comprise at least one resistor operable to regulate current flow through the associated power coupler.

2. A power delivery system, comprising:
   an interface operable to couple to an Ethernet cable comprising a plurality of wire pairs, the plurality of wire pairs including each and every connector operable to provide power to a powered device and further including each and every connector operable to provide information to and from the powered device;
   a controller operable to:
      provide power to a powered device on all of the wire pairs; and
      determine that the powered device requires less power than an amount previously provided by all of the wire pairs, and in response, provide power on a reduced number of wire pairs, the reduced number of wire pairs being greater than zero wire pairs; and wherein:
   the powered device is coupled to the Ethernet-grade cable using a plurality of power couplers; and
   the power couplers each comprise at least one resistor operable to regulate current flow through the associated power coupler.

* * * * *